United States Patent
Takata

(10) Patent No.: US 8,300,174 B2
(45) Date of Patent: Oct. 30, 2012

(54) OPTICAL MEMBER, LIGHTING DEVICE FOR DISPLAY DEVICE, DISPLAY DEVICE AND TELEVISION RECEIVER

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 397 days.

(21) Appl. No.: 12/676,959

(22) PCT Filed: Apr. 15, 2008

(86) PCT No.: PCT/JP2008/057343
§ 371 (c)(1),
(2), (4) Date: Mar. 8, 2010

(87) PCT Pub. No.: WO2009/034737
PCT Pub. Date: Mar. 19, 2009

(65) Prior Publication Data
US 2010/0195021 A1   Aug. 5, 2010

(30) Foreign Application Priority Data
Sep. 14, 2007   (JP) .................................. 2007-239425

(51) Int. Cl.
*G02F 1/1335* (2006.01)
(52) U.S. Cl. ........................................... 349/64; 349/65
(58) Field of Classification Search ................... None
See application file for complete search history.

(56) References Cited

U.S. PATENT DOCUMENTS
2003/0081153 A1*  5/2003  Kobayashi et al. ............. 349/95

FOREIGN PATENT DOCUMENTS
| JP | 2002-107510 A | 4/2002 |
| JP | 2005-221619 A | 8/2005 |
| JP | 2006318668 A | * 11/2006 |

OTHER PUBLICATIONS

Official Communication issued in International Patent Application No. PCT/JP2008/057343, mailed on Jul. 29, 2008.

* cited by examiner

*Primary Examiner* — Thanh-Nhan P Nguyen
(74) *Attorney, Agent, or Firm* — Keating & Bennett, LLP

(57) ABSTRACT

An optical member 15 of the present invention includes a lens sheet 28, a light diffusing sheet 27 and light reflecting members 24. The lens sheet 28 has a plurality of convex lenses 29 on an inner surface thereof. The light diffusing sheet 27 is disposed so as to face the lens sheet 28 and diffuses light. The light reflecting members 24 are selectively arranged in boundary areas of the plurality of convex lenses 29 between the lens sheet 28 and the light diffusing sheet 27. The lens sheet 28 has a surface having a light guiding direction and a non-light-guiding direction that crosses the light guiding direction because the convex lenses 29 have anisotropy for collecting light. The light diffusing sheet 27 has diffuseness larger in the light guiding direction of the lens sheet 28 than in the non-light-guiding direction of the lens sheet 28.

11 Claims, 12 Drawing Sheets

OPTICAL MEMBER, LIGHTING DEVICE FOR DISPLAY DEVICE, DISPLAY DEVICE AND TELEVISION RECEIVER

TECHNICAL FIELD

The present invention relates to an optical member, a lighting device for a display device, a display device and a television receiver.

BACKGROUND ART

A liquid crystal display device generally includes a liquid crystal panel that is a display panel and a backlight unit that is an external light source disposed behind the liquid crystal panel. The backlight unit includes a plurality of cold cathode tubes that are linear light sources, and an optical member for converting light emitted from each cold cathode tubes to even planar light. An example configuration of the optical member is disclosed in Patent Document 1.
Patent Document 1: JP-A-2005-221619

Problem to be Solved by the Invention

The optical member disclosed in Patent Document 1 includes a lens portion having a plurality of cylindrical lenses arranged on one surface and a reflection layer having an opening on the other surface. Diffuser plates are arranged so as to sandwich the lens portion and the reflection layer. The reflection layer is formed in an area corresponding to a non-light-guiding area of the cylindrical lens and the opening is provided in an area corresponding to the light guiding area of the cylindrical lens. Therefore, a light diffusion angle can be easily controlled by adjusting a size ratio between the reflection layer and the opening. As a result, light emitted toward an area that is not used for display can be reduced and thus light use efficiency can be improved.

In the above optical member, light in an arrangement direction of the lens portion (i.e., a direction in which lenses are arranged) is collected. Therefore, a luminance reduction occurs in a direction diagonal to the arrangement direction. On the other hand, light in a longitudinal direction of the lenses is not collected. Therefore, a luminance reduction does not occur in a direction diagonal to the longitudinal direction and thus substantially even luminance is provided. Namely, the above optical member has a problem associated with the luminance reduction in the direction diagonal to the lens arrangement direction in collection of light.

DISCLOSURE OF THE PRESENT INVENTION

The present invention was made in view of the foregoing circumstances, and an object thereof is to provide an optical member that can offer high luminance in both light guiding direction and non-light-guiding direction of the lenses and improve the light diffuseness and the light use efficiency. Another object of the present invention is to provide a display device having such a lighting device for a display device and a television receiver having such a display device.

Means for Solving the Problem

To solve the above problem, an optical member of the present invention includes a lens sheet, a light diffusing sheet and light reflecting members. The lens sheet has a plurality of convex lenses arranged on an inner surface thereof. The light diffusing sheet is arranged so as to face the lens sheet and diffuses light. The light reflecting members are selectively arranged in boundary areas of the plurality of convex lenses. Because the convex lenses have anisotropy for collecting light, the inner surface of the lens sheet has a light guiding direction and a non-light-guiding direction that crosses the light guiding direction. The light diffusing sheet has diffuseness in the light guiding direction of the lens sheet larger than in the non-light-guiding direction of the lens sheet.

According to such an optical member, the diffuseness of the light diffusing sheet has anisotropy, that is, the diffuseness is larger in the light guiding direction of the lens sheet than in the non-light-guiding direction. This resolves the problem that luminance in a direction diagonal to the light guiding direction is lower than in the non-light-guiding direction. Namely, the known light diffusing sheet has isotropic diffuseness and thus it cannot compensate for the luminance reduction in a certain direction (light guiding direction) on the lens sheet. By providing the light diffusing sheet having anisotropic diffuseness as in the present invention, the luminance reduction in a certain direction (light guiding direction) on the lens sheet can be compensated. Further, the diffuseness and the light use efficiency can be improved at the same level as before and the optical member that can offer high luminance in both light guiding direction and non-light-guiding direction of the lenses can be provided.

BEST MODE FOR CARRYING OUT THE INVENTION

An embodiment of the present invention will be explained with reference to drawings.

Figure 1:
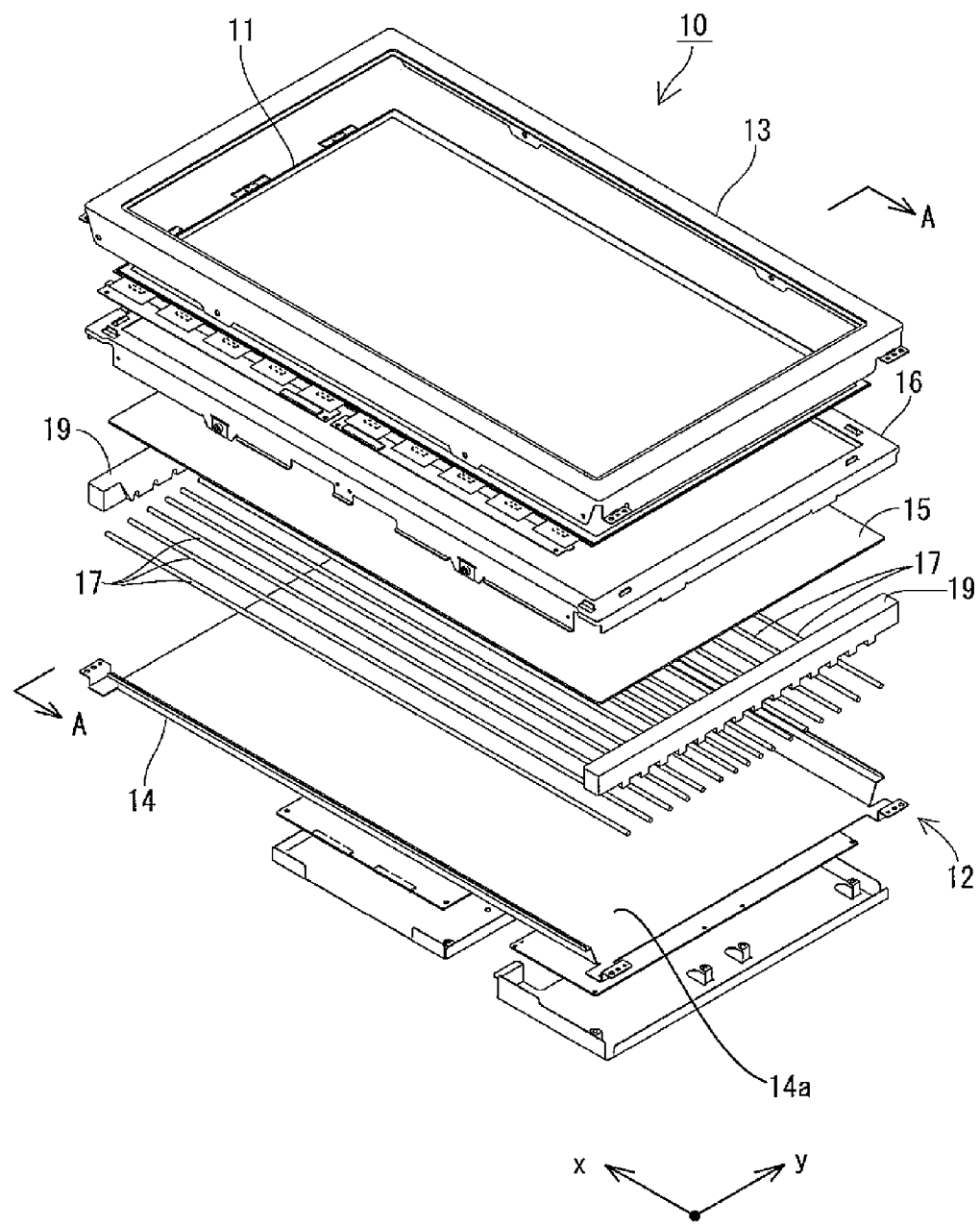
FIG. 1 is an exploded perspective view illustrating the general construction of a liquid crystal display device according to an embodiment.
Figure 2:
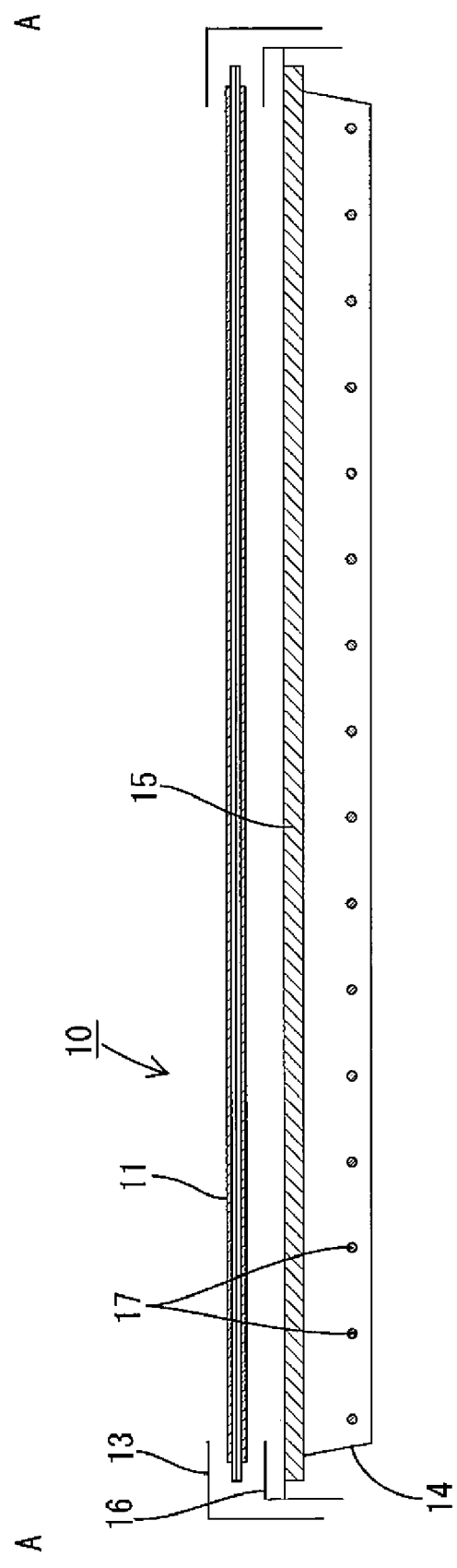
FIG. 2 is a cross-sectional view of the liquid crystal display device illustrated in FIG. 1 along the line A-A.
Figure 3:
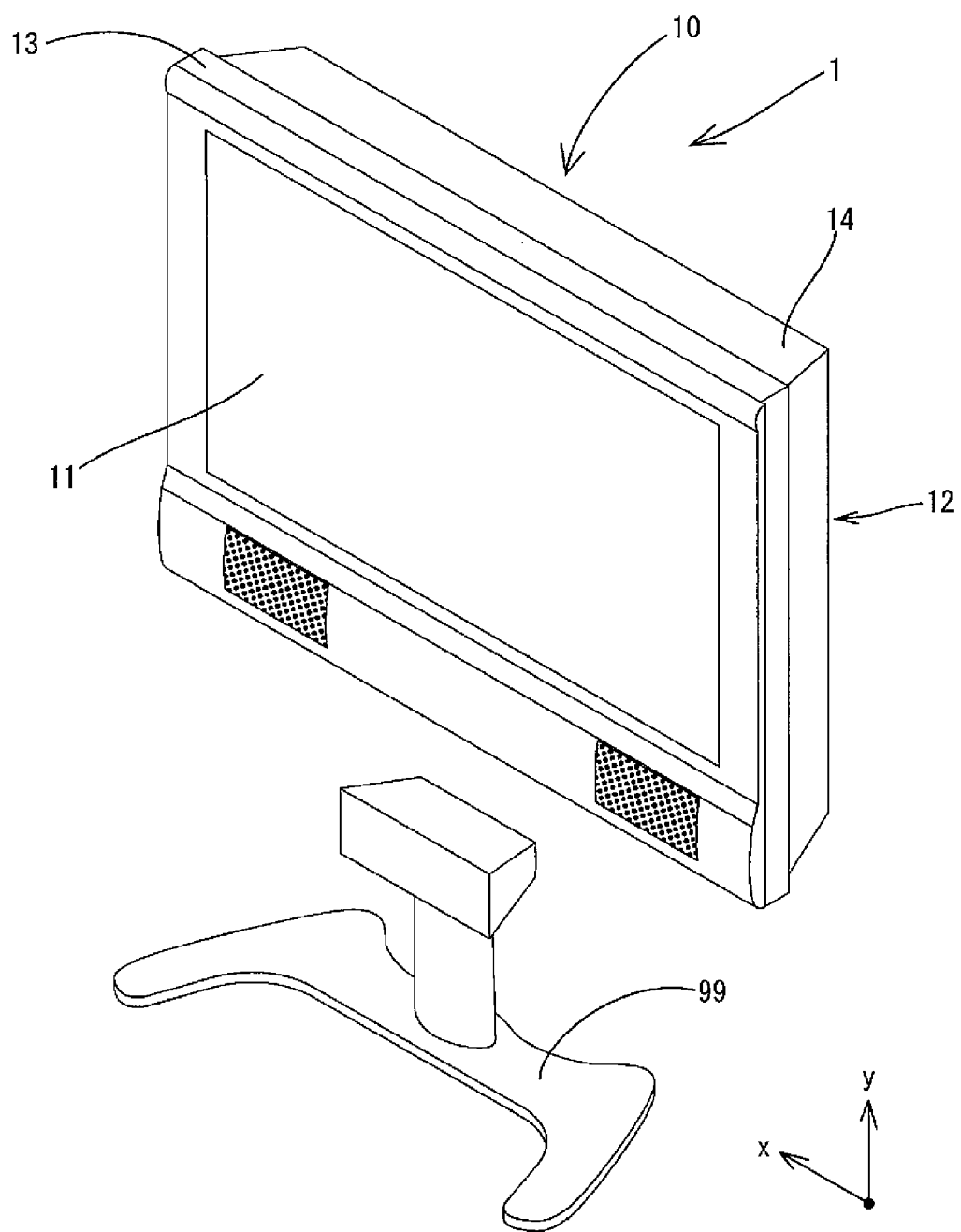
FIG. 3 is a perspective view of an embodiment of a television receiver using the liquid crystal display device.
Figure 4:
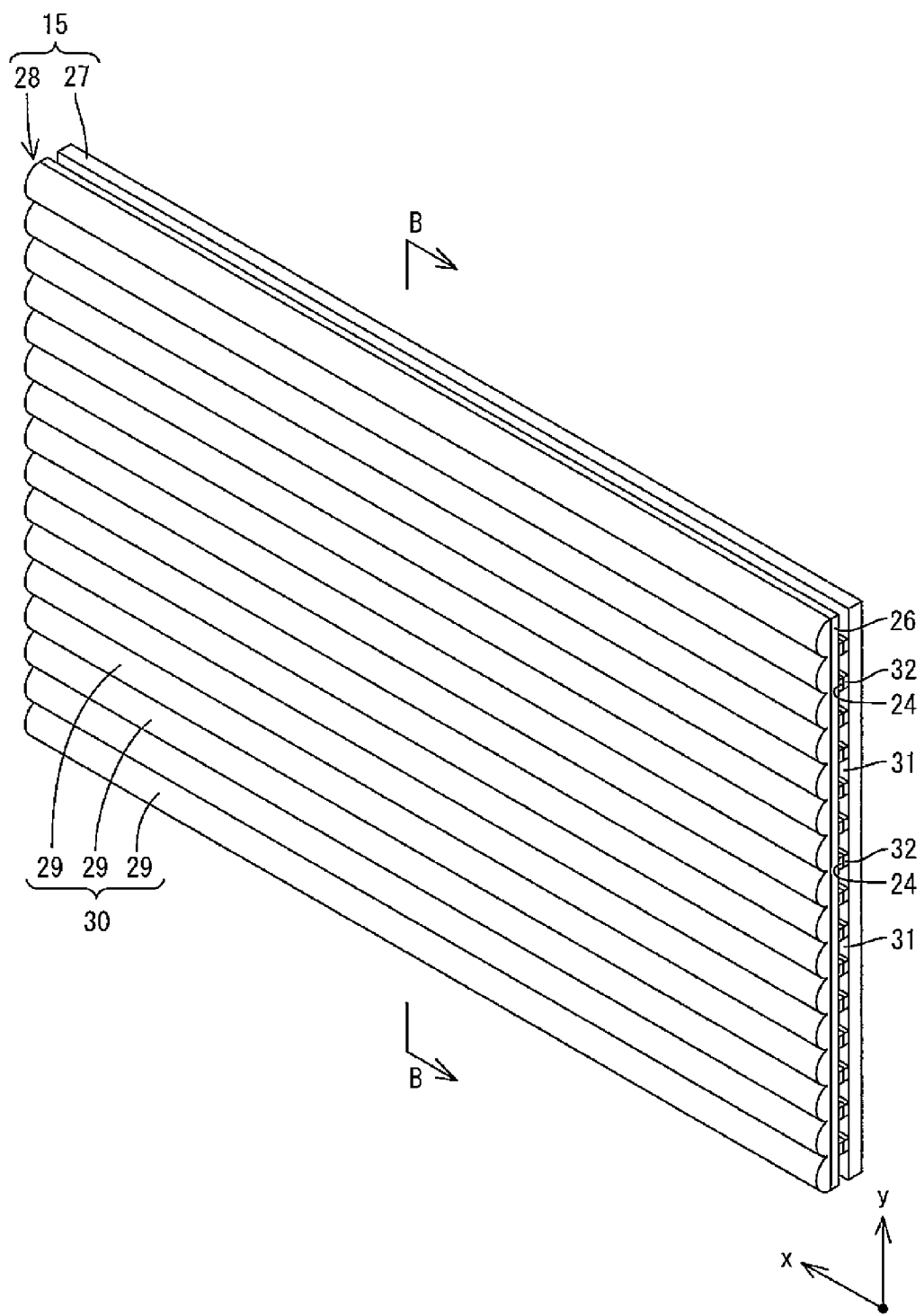
FIG. 4 is a perspective view illustrating the general construction of an optical member included in the liquid crystal device.
Figure 5:
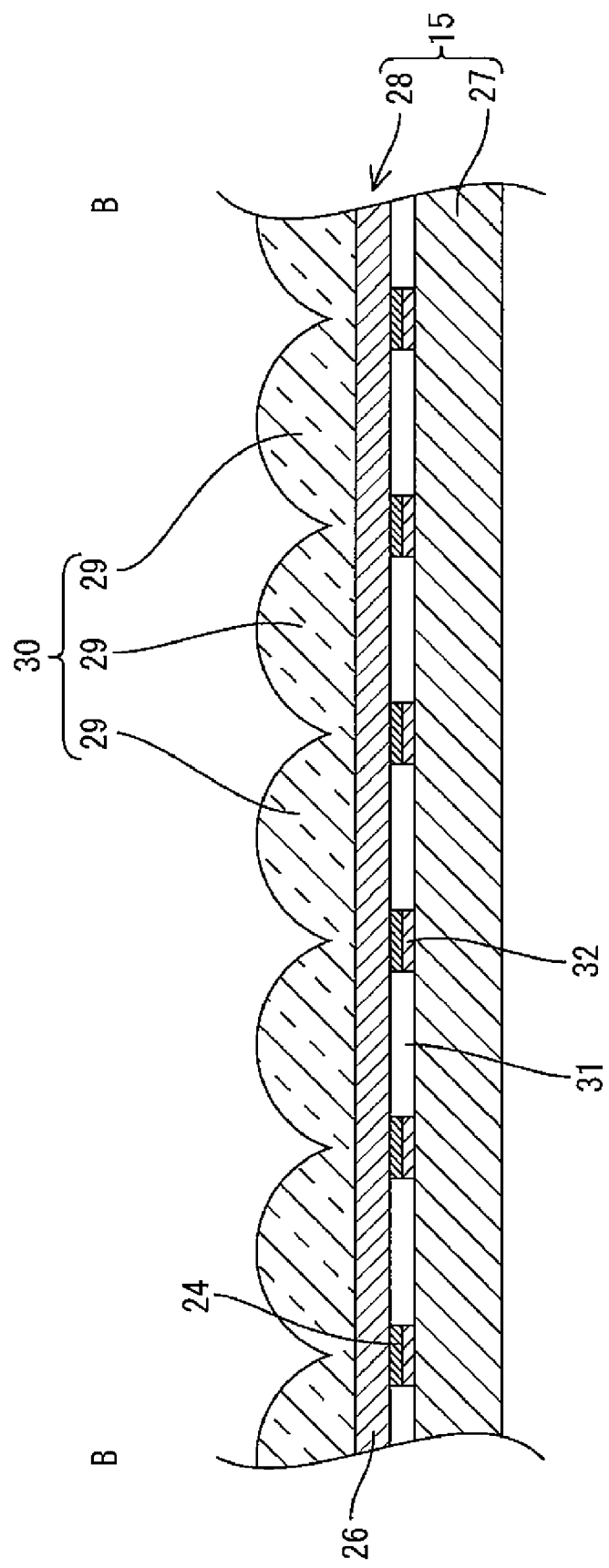
FIG. 5 is a cross-sectional view illustrating a construction of FIG. 4 along the line B-B.
Figure 6:
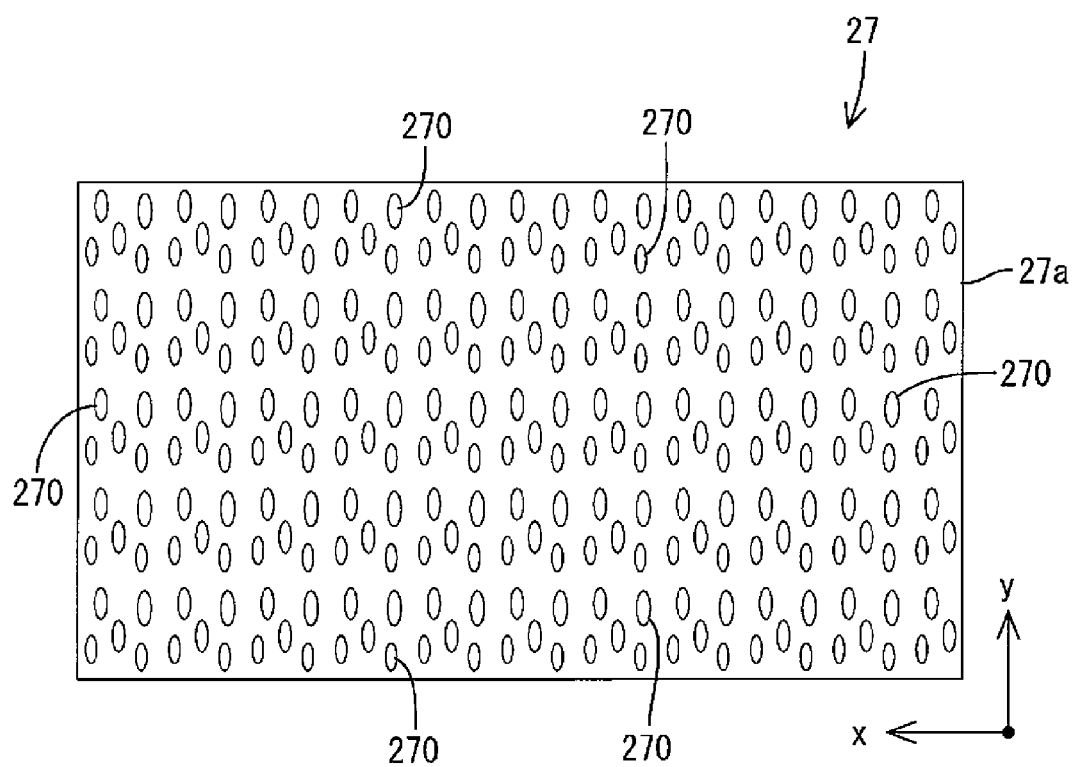
FIG. 6 is a schematic view illustrating a construction of a light diffusing sheet included in the optical member.

FIG. 1 is an exploded perspective view illustrating the general construction of a liquid crystal display device (display device) 10 of the present embodiment. FIG. 2 is a cross-sectional view of FIG. 1 along the line A-A. FIG. 3 is a perspective view of an embodiment of a television receiver using the liquid crystal display device 10. FIG. 4 is a perspective view illustrating the general construction of an optical member 15 included in the liquid crystal device 10. FIG. 5 is a cross-sectional view illustrating a construction of FIG. 4 along the line B-B. FIG. 6 is a schematic view illustrating a construction of a light diffusing sheet 27 included in the optical member 15. An x-axis and a y-axis are shown in some drawings to indicate orientations of the illustrations.

First, a general configuration of the liquid crystal display device (display device) 10 will be explained.

As illustrated in FIGS. 1 and 2, the liquid crystal display device 10 includes a liquid crystal panel (display panel) having a rectangular plan view and a backlight device (lighting device for a display device) 12 that is an external light source. They are integrally held by a bezel 13 and the like. The liquid crystal display device 10 can be used in a television receiver 1, for example, as illustrated in FIG. 3. The television receiver includes the liquid crystal display device 10, in which the liquid crystal panel 11 and the backlight device 12 are integrally held by the bezel 13, and a stand 99 that supports the liquid crystal display device 10 from underneath.

The liquid crystal panel 11 has a known configuration such that liquid crystal (a liquid crystal layer) that changes its characteristics according to applied voltages is sealed between a transparent TFT substrate and a transparent CF substrate. A number of source lines and gate lines are formed on an inner surface of the TFT substrate. The source lines extend in a longitudinal direction and the gate lines extend a transverse direction so as to form a grid pattern. Color filters including red (R), green (G) and blue (B) are provided on the CF substrate. Polarizing plates are attached to surfaces of those substrates on sides opposite to the liquid crystal side.

The backlight device 12 is a so-called direct backlight device in which a light source is arranged closely below the liquid crystal panel 11. The backlight device 12 includes a chassis 14, a reflective sheet 14a, an optical member 15, a frame 16, cold cathode tubes 17 and lamp holders 19. The chassis 14 has an opening on the front (light emitting side). The reflective sheet 14a is placed inside the chassis 14. The optical members 15 are arranged around the opening of the chassis 14. The frame 16 holds the optical member 15. The cold cathode tubes 17 are installed in the chassis 14. The lamp holders 19 position and fix the cold cathode tubes 17 to the chassis 14.

The chassis 14 is formed of metal and in a substantially box-shape having a rectangular plan view and an opening on the front (light emitting side). The reflective sheet 14a is made of synthetic resin and a white material having good reflectivity. It is disposed in the chassis 14 so as to cover an entire inner surface of the chassis 14. The reflective sheet 14a directs most light emitted from each cold cathode tube 17 toward an opening side of the chassis 14.

The optical member 15 converts linear light emitted from each cold cathode tube 17, which is a linear light source, to planar light. Then, it directs the planar light toward an effective display area of the liquid crystal panel 11. It has a landscape rectangular shape similar to the liquid crystal panel 11 and the chassis 14, and a configuration illustrated in FIGS. 4 and 5.

Specifically, a diffusing sheet (light diffusing sheet) 27 and a lens sheet 28 are bonded together. The diffusing sheet 27 diffuses light. It includes a synthetic resin base material (light transmissive sheet) 27a that is capable of light transmission, and light scattering particles 270 that diffuse light are spread therein. Each light scattering particle 270 is an oval particle having a long axis and a short axis. The light scattering particles 270 are mixed such that the long axes thereof are aligned along the y-axis in the drawing. Thus, the diffusing sheet 27 has relatively larger light diffuseness in the y-axis direction than in the x-axis direction.

The lens sheet 28 has a lens portion 30 that includes a plurality of convex cylindrical lenses 29 arranged in parallel on a light transmissive base material 26 so as to have anisotropy for collecting light (i.e., to selectively collect light traveling in a certain direction). Each convex cylindrical lens 29 is a half-column shape convex lens and disposed on the inner surface of the base material so as to extend in the x-axis direction. Specifically, the convex cylindrical lenses 29 are arranged with their longitudinal direction aligned with the x-axis direction and in parallel in the y-axis direction. Therefore, light traveling in the y-axis direction is collected by the convex cylindrical lenses 29 but light traveling in the x-axis direction is not collected by the convex cylindrical lenses 29. The lens sheet 28 is designed so as to have a light guiding direction in the y-axis direction and a non-light-guiding direction in the x-axis direction on the surface.

Light diffusion anisotropy of the diffusing sheet 27 and light collection anisotropy of the lens sheet 28 are relative to each other. Specifically, the diffuseness of the diffusing sheet 27 in the y-axis direction, that is, the light guiding direction of the lens sheet 28 is larger than in the x-axis direction, that is, the non-light guiding direction of the lens sheet 28. In other words, the diffuseness of the diffusing sheet 27 is defined so that the diffuseness in the parallel direction of the lens sheet 28 is relatively larger than that in the longitudinal direction of the lens sheet 28.

A light reflection layer 32 is formed in stripes. It is formed in selective areas that overlap boundary areas of the convex cylindrical lenses 29 when vied in plan. In areas between lines of the light reflection layer 32, that is, areas that overlap focus areas of the convex cylindrical lenses 29 when vied in plan, light transmissive portions 31 are formed. Namely, the light reflection layer 32 and the light transmissive portions 31 have band-like shapes with a predetermined width and substantially parallel to the length direction of the convex cylindrical lenses 29. As a result, an overall view thereof looks stripes.

The light reflection layer 32 is formed in areas, each of which is defined with a predetermined width and a center at a bottom of trough between the adjacent convex cylindrical lenses 29. Each light transmissive portion 31 is formed in an area having a predetermined width and a center at a peak of the corresponding cylindrical lens 29. The light transmissive portions 31 are air layer, a refraction index of which is different from that of the diffusing sheet 27 or the lens sheet 28. The light reflection layer 32 is made of a resin base material in which white titanium oxide fine particles, for example, are spread and mixed. An arrangement interval of the convex cylindrical lenses 29 (lens pitch) and that of lines of the reflection layer 32 (reflection layer pitch) are defined as substantially the same, for example, about 140 μm.

Returning to FIGS. 1 and 2, the cold cathode tubes 17 are one kind of linear light sources (tubular light sources) and mounted in the chassis 14 with the axis direction thereof aligned with the longitudinal direction of the chassis 14. A plurality of them are arranged with the axis thereof substantially parallel to each other and with predetermined gaps therebetween. The diffusing sheet 27 of the optical member 15 is disposed so that the diffuseness thereof in the parallel direction of the cold cathode tubes 17 is larger than that in the longitudinal direction of the cold cathode tubes 17.

After passing through the light transmissive portion 31 of the optical member 15, light emitted from each cold cathode tube 17 directly enters the convex cylindrical lens 29. Then, it exits from the convex cylindrical lens 29 with the directivity thereof set toward the effective display area of the liquid crystal panel 11. On the other hand, light that does not pass through the light transmissive portion 31 is reflected by the light reflection layer 32 and travels back toward the cold cathode tube 17 side. Then, it is directed toward the optical member 15 again by the light reflective sheet 14*a* and the like. This is repeated until the light finally passes through the light transmissive portion 31 so that the light is recycled. In the optical member 15, a ratio of widths between the light reflection layer 32 and the light transmissive portion 31 can be adjusted and thus the light emitting angle (light diffusion angle) can be properly controlled.

According to the liquid crystal display device 10 of the present embodiment, the optical member 15 included in the backlight device 12 has the diffusing sheet 27 with anisotropic diffuseness. Specifically, the diffuseness in the light guiding direction of the lens sheet 28 (x-axis direction in the drawings) is larger than that in the non-light-guiding direction of the lens sheet 28 (y-axis direction in the drawings). This solves the problem that the luminance in the direction diagonal to the light guiding direction (y-axis direction) of the lens sheet 28 is lower than the non-light-guiding direction (x-axis direction).

If the diffuseness of the diffusing sheet 27 is isotropic and the luminance on the lens sheet 28 in the direction diagonal to the light guiding direction (y-axis direction) is low, the diffusing sheet 27 cannot compensate for this problem. By preparing the diffusing sheet 27 having anisotropic diffuseness, the luminance reduction in the direction diagonal to the light guiding direction (y-axis direction) of the lens sheet 28 can be compensated. As a result, the light diffuseness and the light use efficiency are improved and high luminance is provided in both light guiding direction and non-light-guiding direction of the lens sheet 28. Therefore, the backlight device 12 can provide planar light with high luminance for the liquid crystal panel 11. The liquid crystal display device 10 using light from the backlight device 12 can provide bright and high quality display.

Figure 11:
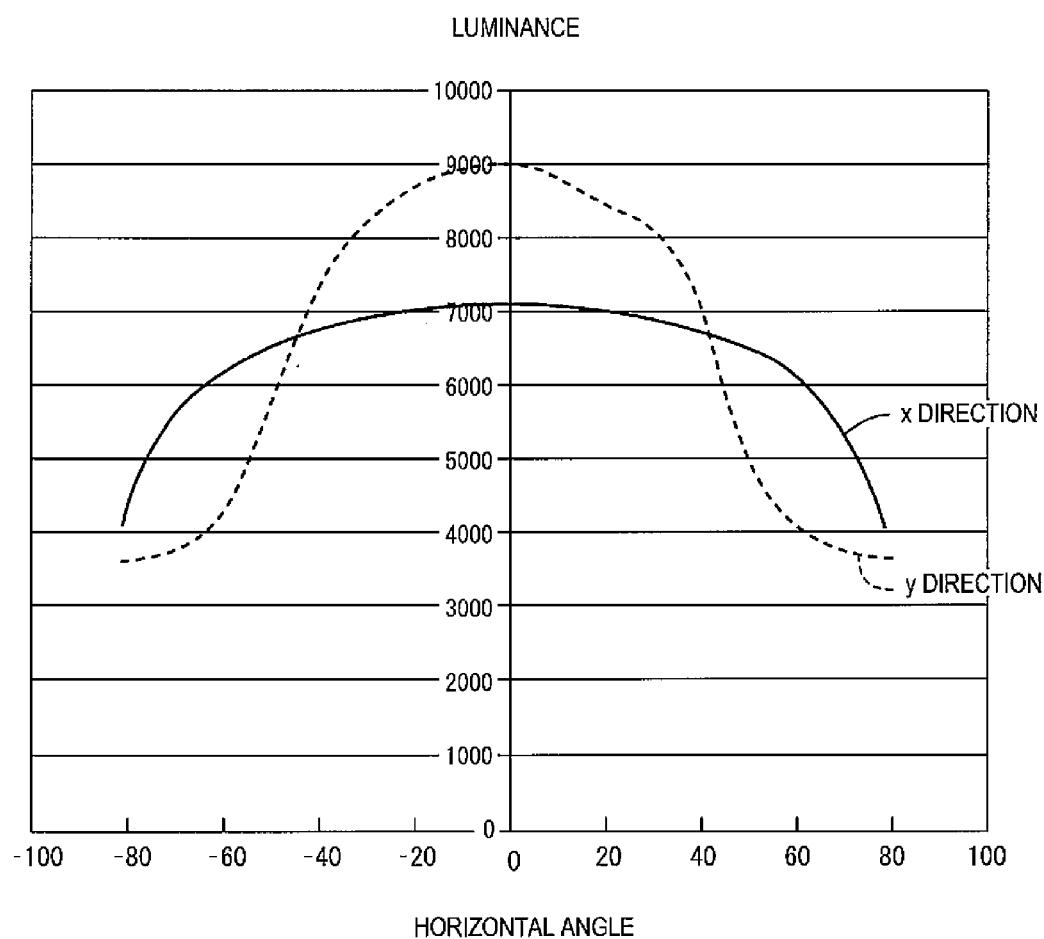
FIG. 11 is a graph illustrating luminance distribution of the light diffusing sheet included in the liquid crystal display device of the embodiment.
Figure 12:
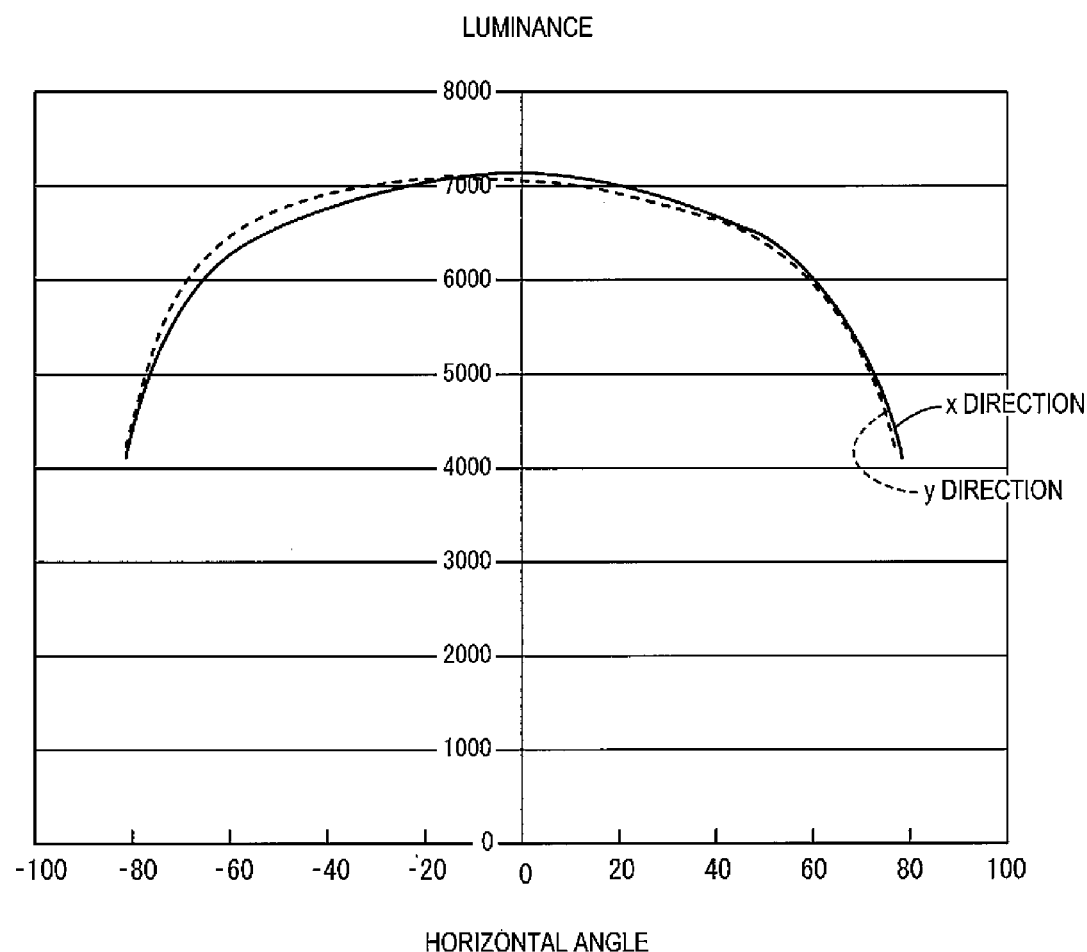
FIG. 12 is a graph illustrating luminance distribution of a comparative example of light diffusing sheet.

FIG. 11 is a graph illustrating luminance distribution of the light diffusing sheet 27 included in the liquid crystal display device 10 of the present embodiment. FIG. 12 is a graph illustrating luminance distribution of a comparative example of light diffusing sheet. In those graphs, horizontal axes indicate horizontal angles and vertical axes indicate luminance.

The diffusing sheet in the comparative example has isotropic diffuseness and thus the luminance is not different between the x direction and the y direction as illustrated in FIG. 12. On the other hand, the diffusing sheet 27 has higher light diffuseness in the y direction and thus the luminance distribution thereof shows relatively high luminance in the y direction as illustrated in FIG. 11.

The liquid crystal display device 10 of the present embodiment can preferably reduce linear shadows of the cold cathode tubes 17 (lamp shadows) by the optical member 15. The diffusing sheet 27 of the optical member 15 is arranged so that the diffuseness in the parallel direction of the cold cathode tubes 17 is larger than that in the longitudinal direction of the cold cathode tubes 17. Therefore, light diffusion is sufficiently taken place in the direction required for reducing the lamp shadows. As a result, the reduction of the lamp shadows is even more preferably performed.

In this embodiment, the base material (light transmissive sheet) 27*a* in which the oval light scattering particles 270 are mixed is used as the diffusing sheet 27. The light scattering particles 270 are mixed so that the longitudinal direction of each light scattering particle 270 is directed along the y-axis.

Figure 7:
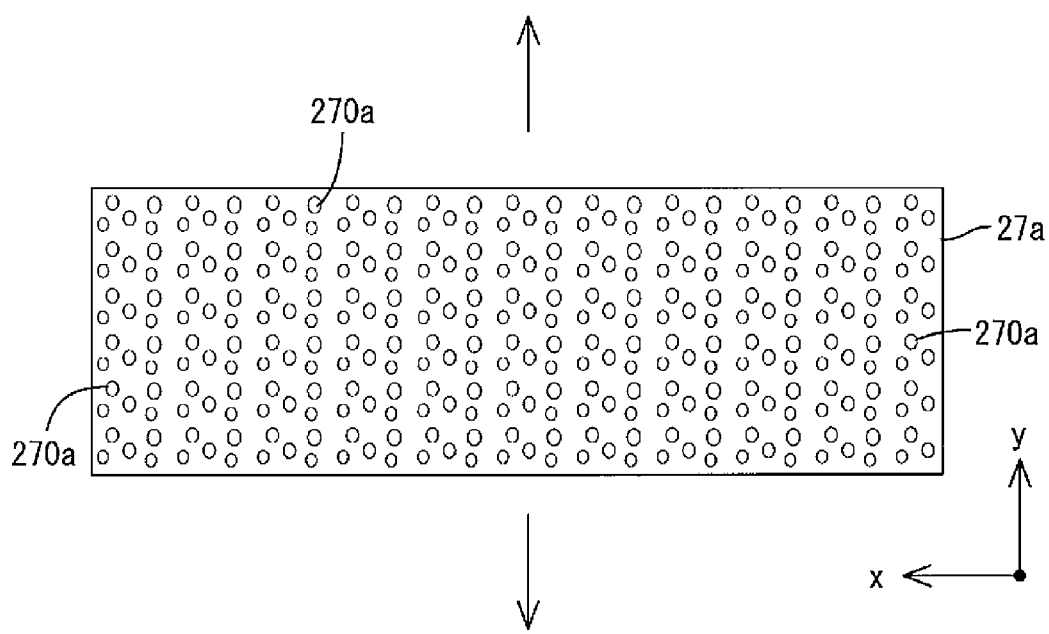
FIG. 7 is an explanatory view illustrating a manufacturing method of the light diffusing sheet.

Such a diffusing sheet 27 can be prepared by stretching the base material (light transmissive sheet) 27*a*, in which spherical light diffusing particles 270*b* are mixed so as to spread, in the y-axis direction, as illustrated in FIG. 7. By the stretching, the spherical particles 270*a* in the sheet change to the oval light scattering particles 270 with the longitudinal direction thereof directed along the y-axis direction.

Figure 10:
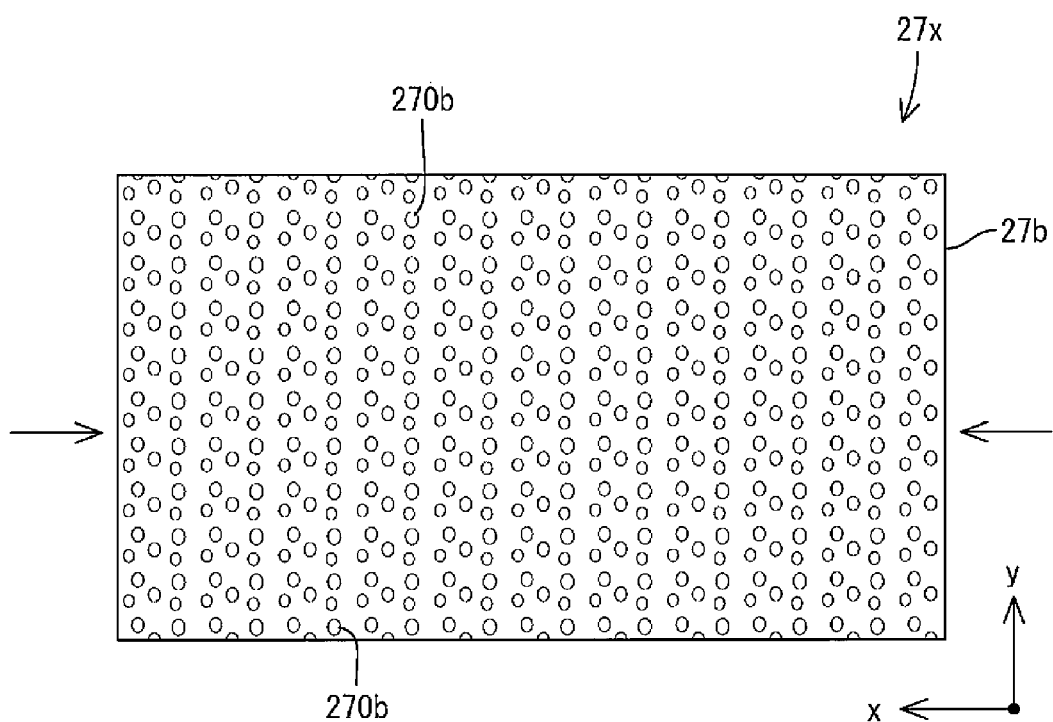
FIG. 10 is an explanatory view illustrating a modification of the manufacturing method of the light diffusing sheet.

Alternatively, as illustrated in FIG. 10, the diffusing sheet can be prepared by compressing the base material (light transmissive sheet) 27*b*, in which spherical light diffusing particles 270*b* are mixed so as to spread, in the x-axis direction. By the compression, the spherical light diffusing particles 270*b* in the sheet change to the oval light scattering particles 270 with the short axis direction thereof directed along the x-axis direction (i.e., the longitudinal direction is directed along the y-axis direction).

The present invention is not limited to the embodiments explained in the above description made with reference to the drawings. The following embodiments may be included in the technical scope of the present invention, for example.

In the above embodiment, the optical member 15 includes the diffusing sheet 27, in which oval light scattering particles 270 area mixed in the base material (light transmissive sheet) 27*a*, is bonded so as to face the lens sheet 28. However, it may have a diffusing sheet 27*z* illustrated in FIG. 8 bonded so as to face the lens sheet 28.

Figure 8:
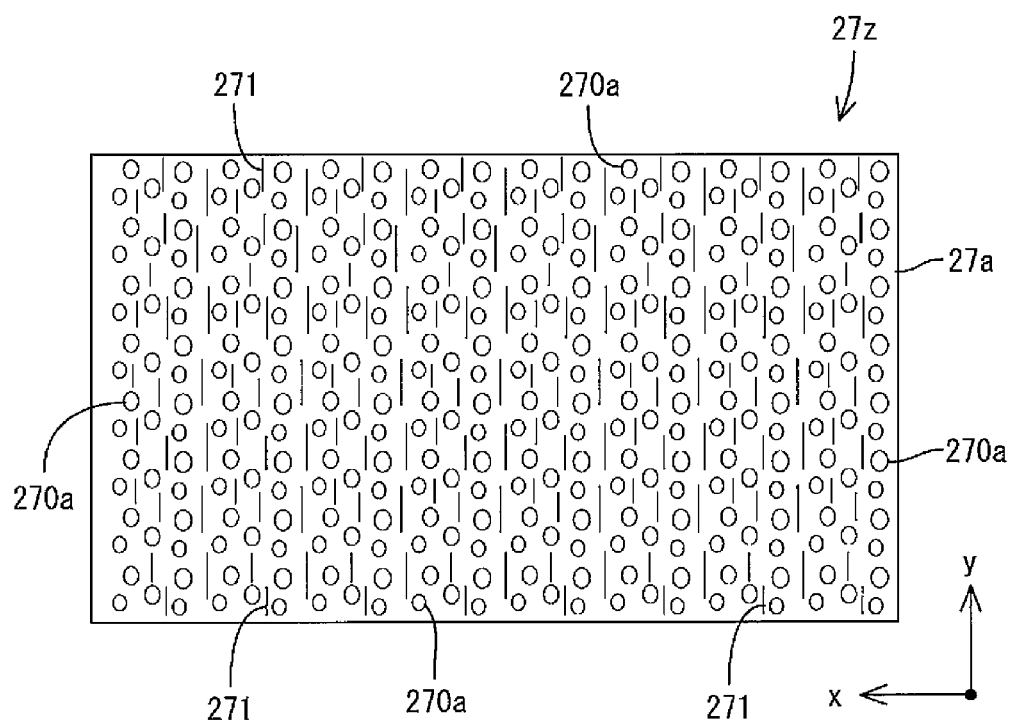
FIG. 8 is an explanatory view illustrating a modification of the light diffusing sheet.

The diffusing sheet 27*z* illustrated in FIG. 8 includes the base material (light transmissive sheet) 27*a* in which the spherical light diffusing particles 270*a* are mixed with blast finish in the y-axis direction. The blast finish creates scratches 271 along the y-axis direction and the scratches 271 improve the light diffuseness in the y-axis direction.

Figure 9:
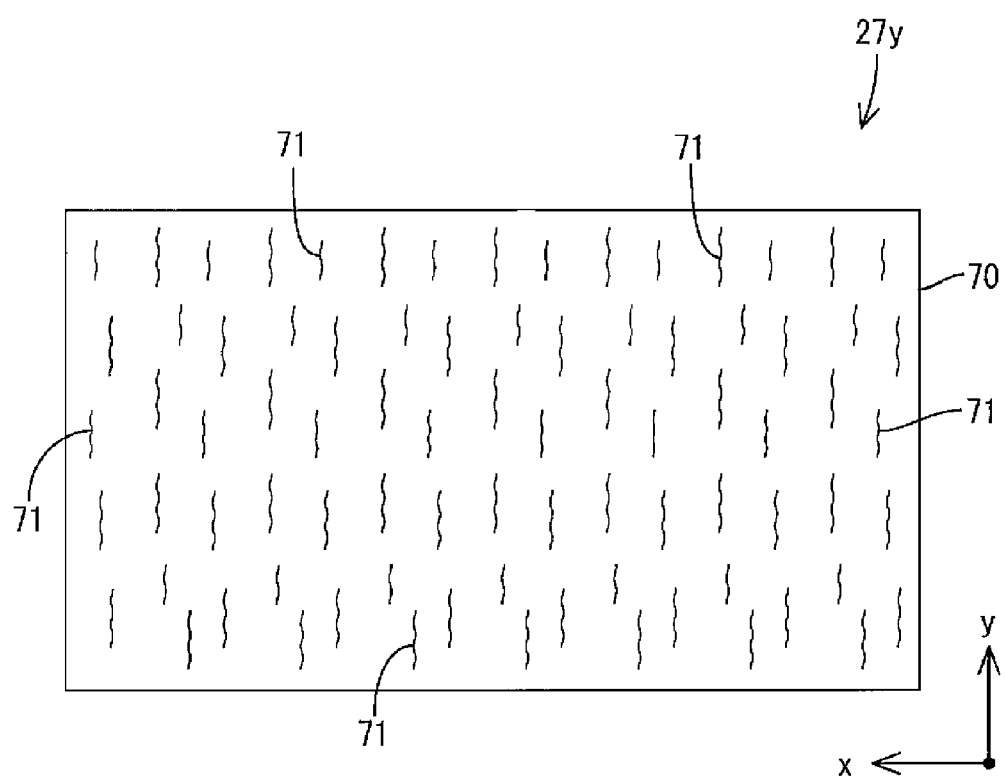
FIG. 9 is an explanatory view illustrating a modification of the light diffusing sheet.

The optical member 15 may have a diffusing sheet 27*y* illustrated in FIG. 9 bonded so as t face the lens sheet 28, for example.

The diffusing sheet 27*y* illustrated in FIG. 9 is prepared by spreading and mixing fibrous light diffusing members 71 in a base material 70. The light diffusing members 71 are mixed in the base material 70 such that a fiber axis of each light diffusing member 71 is aligned along the y-axis direction and thus the light diffuseness in the y-axis direction is enhanced by the fibrous light diffusing members 71.

In the above embodiment, the liquid crystal display device using a liquid crystal panel as a display panel is used. However, the present invention can be applied to a display device using other types of display panels. Further, hot cathode tubes may be used as linear light sources other than the cold cathode tubes

The invention claimed is:

1. An optical member comprising:
a plurality of convex lenses;
a lens sheet including said plurality of convex lenses on a surface thereof;
a light diffusing sheet disposed so as to face said lens sheet and configured to diffuse light; and
a light reflecting member provided between said lens sheet and said light diffusing sheet, and selectively disposed to correspond to boundary areas of the plurality of convex lenses, wherein:
said plurality of convex lenses have anisotropy to collect light such that the surface of said lens sheet has a light guiding direction and a non-light-guiding direction that crosses the light guiding direction;
said light diffusing sheet is configured to have diffuseness larger in the light guiding direction of said lens sheet than in the non-light-guiding direction of said lens sheet;
the plurality of convex lenses are convex cylindrical lenses;
said lens sheet is configured to included the convex cylindrical lenses arranged in parallel; and said light diffusing sheet is configured to have the diffuseness larger in a parallel direction of the convex cylindrical lenses than in a longitudinal direction of the convex cylindrical lenses.

2. An optical member according to claim 1, wherein:

said light diffusing sheet includes a light transmissive sheet and light diffusing particles spread in the light transmissive sheet; and the light diffusing particles include long axes and short axes, and are mixed such that the long axes are aligned along the light guiding direction of the plurality of convex lenses.

3. An optical member according to claim 1, wherein:

said light diffusing sheet includes a light transmissive sheet and light diffusing fibers spread in the light transmissive sheet; and the light diffusing fibers are mixed such that a longitudinal direction thereof is aligned along the light guiding direction of the plurality of convex lenses.

4. An optical member according to claim 1, wherein said light diffusing sheet is a light transmissive sheet containing light diffusing particles, the light transmissive sheet being stretched in the light guiding direction of the plurality of convex lenses.

5. An optical member according to claim 1, wherein said light diffusing sheet is a light transmissive sheet containing light diffusing particles, the light transmissive sheet being compressed in the non-light-guiding direction of the plurality of convex lenses.

6. An optical member according to claim 1, wherein the light diffusing sheet is a light transmissive sheet containing light diffusing particles, the light transmissive sheet being blast finished in one direction along the light guiding direction of the plurality of convex lenses.

7. A lighting device for a display device, comprising:

a light source; and the optical member according to claim 1 disposed on a light emitting side of the light source.

8. A lighting device for a display device according to claim 7, wherein:

the light source is a plurality of linear light sources arranged in parallel; and said light diffusing sheet of said optical member is configured to have diffuseness larger in a parallel direction of the plurality of linear light sources than in a longitudinal direction of the plurality of linear light sources.

9. A display device comprising:

a lighting device for a display device according to claim 8; and a display panel disposed on a light emitting side of the lighting device for a display device.

10. A display device according to claim 9, wherein said display panel is a liquid crystal panel including a liquid crystal layer sandwiched between a pair of substrates.

11. A television receiver comprising a display device according to claim 9.

* * * * *